UNITED STATES PATENT OFFICE.

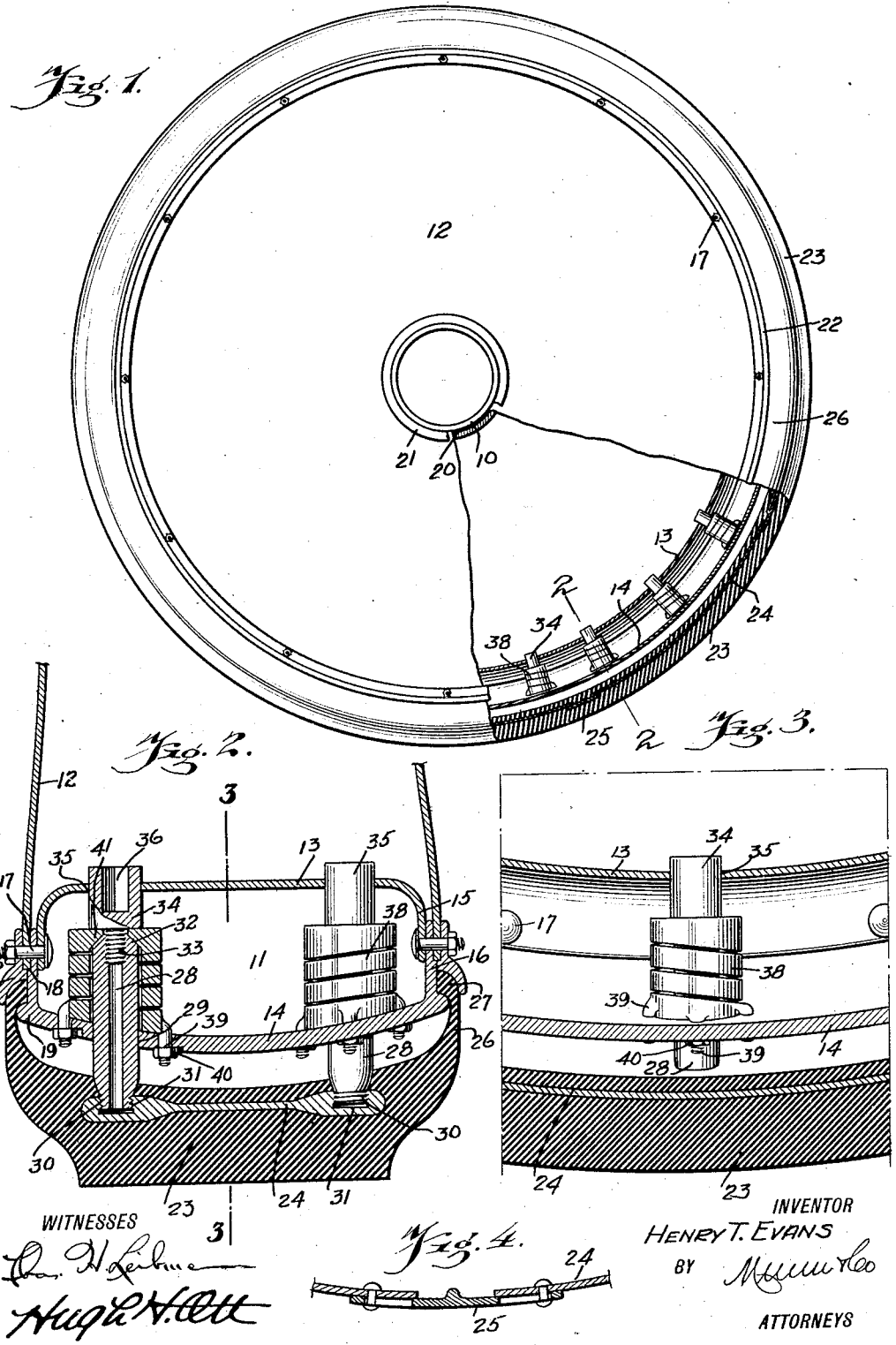

HENRY T. EVANS, OF MANHASSET, NEW YORK.

RESILIENT WHEEL.

1,406,949. Specification of Letters Patent. Patented Feb. 14, 1922.

Application filed August 31, 1921. Serial No. 497,169.

*To all whom it may concern:*

Be it known that I, HENRY T. EVANS, a citizen of the United States, and a resident of Manhasset, in the county of Nassau and State of New York, have invented a new and Improved Resilient Wheel, of which the following is a full, clear, and exact description.

This invention relates to vehicle wheels and refers more particularly to an improvement in resilient wheels for motor vehicles.

Primarily the invention contemplates a non-pneumatic wheel which embodies the same resiliency and shock absorbing qualities as a wheel equipped with a pneumatic tire, in addition to eliminating the disadvantages attendant upon pneumatic tires.

The invention further contemplates a resilient non-pneumatic wheel consisting of standard interchangeable parts, capable of removal and replacement when worn or broken, and one which is readily assembled or disassembled for the purpose of repair, cleaning or lubrication.

A further object of the invention resides in the provision of a wheel of the character described which is comparatively simple in its construction, inexpensive to manufacture, and which is thoroughly reliable and highly efficient in its purpose.

With the above recited and other objects in view, the invention resides in the novel construction, set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variations in the phraseology of the same.

In the drawing—

Figure 1 is a side elevation of a wheel constructed in accordance with the invention, parts being broken away and shown in section to disclose the underlying structure.

Fig. 2 is an enlarged fragmentary cross sectional view therethrough taken approximately on the line 2—2 of Fig. 1.

Fig. 3 is a fragmentary longitudinal sectional view taken approximately on the line 3—3 of Fig. 2.

Fig. 4 is a fragmentary sectional view of one of the details of the invention.

Referring to the drawings by characters of reference, 10 designates the hub of the wheel and 11 the rim or felly which is concentrically supported therefrom by the side plates 12 which are employed in lieu of spokes. The rim or felly preferably consists of inner and outer sections 13 and 14, the former being provided with outwardly disposed marginal flanges 15 and the latter with inwardly disposed marginal flanges 16 to snugly receive and accommodate the flanges 15 therebetween, the edges of said flanges being overlapped and provided with aligned apertures for the reception of the bolts 17. The outer faces of the flanges 16 are recessed as at 18 and the outer section 14 at its juncture with the flanges 16 is provided with exterior annular ribs 19. The opposite extremities of the hub 10 are reduced in diameter to accommodate the central openings of the plates 12, said reduced extremities forming shoulders 20 at their juncture with the major portion of the hub against which the plates 12 abut. Retaining rings 21 are arranged over the reduced extremities of the hub to retain the plates 12 in position thereon. The outer peripheral edges of the plates 12 are fitted into the recesses 18 and are provided with apertures disposed in alignment with the apertures in the flanges 15 and 16 to receive and accommodate the bolts 17. Clincher rings 22 having apertures disposed in alignment with the apertures of the flanges 15 and 16 and the outer peripheral edges of the plate 12 are arranged over the bolts 17 for clamping said outer peripheral edges to the rim 11.

Use is made of a tread member designated generally by the character 23, the same being constructed of elastic material such as rubber or a mixture of fabric and rubber having molded or otherwise embedded therein a reinforcing ring 24 consisting of a plurality of arcuate sections having slidable connection at their opposite extremities with the connector plates 25 whereby to permit of a limited radial contraction and expansion of the reinforcing ring with the elastic tread member. The tread member is provided with inwardly disposed side flanges 26 terminating in retaining beads 27 adapted to be clamped between the ribs 19 and the clincher rings 22 for the purpose of detachably securing its opposite sides of the rim or felly.

The means for yieldably supporting the tread member from the rim includes a plurality of series of radially disposed shanks 28 slidably arranged in the openings 29 in the outer section 14 of the rim. The shanks 28 are preferably of tubular formation with their outer extremities exteriorly threaded as at 30 and engaged in the threaded sockets 31 in the reinforcing ring 24. The inner ends of the shanks are of frusto-conical formation as at 32 and are interiorly threaded to receive the threaded boss 33 of a head 34 slidable through the openings 35 in the inner section 13 of the rim. The heads 34 are provided with squared sockets 36 extending inwardly from their inner ends to permit of the application and association therewith of a suitable tool for separating the heads from the shanks. Coiled contractile springs 38 are secured respectively to the outer section of the rim member and to the shanks 28 for effecting radial projection of the outer extremities thereof to normally place the tread member under tension and yieldably support the same from the rim. The means for attaching the spring to the rim section 14 consists in providing the outermost convolution of said spring with a plurality of axially projecting stud bolts 39 extending through suitably formed apertures in the section 14 upon which the retaining nuts 40 are threaded. The manner of attaching the inner end of the springs to the shank 28 consists in providing the inner convolution of each spring with a beveled projection 41 which is clamped between the head 34 and the frusto-conical end of the shank through the engagement of the threaded boss 33 with the interiorly threaded inner end of the shank.

In operation the load of a vehicle with which the wheel is attached will be carried by springs 38 which will yieldably resist the inward movement of the rim to absorb the road shocks and function in a manner similar to that of a pneumatic tire. The side plates 12 which are of arcuate formation in cross section are capable of a slight flexing action, thereby assisting in a measure the springs 38 to absorb the heavier shocks imparted to the wheel. The springs 38, shanks 28, and heads 34 are of standard formation and interchangeable, the same being assembled in such a manner as to permit of their ready removal and replacement in case of breakage or wear. Likewise the tread member may be removed and replaced when worn to add to the life of the wheel.

It will thus be seen that a comparatively simple and inexpensive elastic and resilient wheel has been provided which embodies practically the same shock absorbing qualities as a wheel equipped with a pneumatic tire, but which is puncture-proof and otherwise free from the disadvantages and detrimental features of a pneumatic tire.

Having thus described my invention, what I claim is:

1. In a non-pneumatic resilient wheel, a hub, a rim member supported concentrically therefrom, said member comprising inner and outer sections, radially disposed elements carried by said sections and slidable therethrough, means carried by the outer section coacting with said elements for effecting normal radial projection of their outer extremities from the rim member, and an elastic tread member secured to the rim and supported by the outer extremity of said elements yieldably and under tension.

2. In a wheel of the character described including a hub, a rim concentrically supported therefrom and an elastic annular tread member secured at its opposite side edges to the opposite sides of the rim and provided with a circumferentially contractible and expansible reinforcing ring embedded therein, of means for yieldably supporting the tread member from the rim comprising radially disposed shanks slidable through the rim and attached to the reinforcing ring of the tread member at their outer ends, and coiled contractile springs secured respectively at their opposite ends to the rim and the shanks to effect normal radial projection of the shanks for supporting the tread member from the rim under tension.

3. A non-pneumatic resilient wheel, comprising a hub, a rim member supported concentrically therefrom, said rim member comprising inner and outer sections, said inner section having outwardly disposed side flanges, said outer section having inwardly disposed side flanges between which the side flanges of the inner section are received, laterally projecting annular ribs formed at the juncture of the outer section with its side flanges, clincher rings at the opposite sides of the flanges of the outer section, a tread member having inwardly disposed side flanges provided with beads interposed between the ribs and the clincher rings, and means carried by the outer section for effecting normal radial projection of the tread member from the outer side of the outer section of the rim member.

4. In a wheel of the character described including a hub, a rim concentrically supported therefrom, and an elastic annular tread member secured at its opposite side edges to the opposite sides of the rim and provided with a circumferentially contractible and expansible reinforcing ring embedded therein, of means for yieldably supporting the tread member from the rim comprising radially disposed shanks slidable through the rim and attached to the reinforcing ring of the tread member at their outer ends, coiled contractile springs surrounding the inner ends of the shanks and secured at their outer ends to the rim, complementary conical faces on the inner ends of the shanks and the inner convolutions of the springs, and means carried by the inner ends of the shanks for clamping said complementary conical faces into engagement with each other whereby to effect normal radial projection of the shanks for supporting the tread member from the rim under tension.

HENRY T. EVANS.